Oct. 16, 1962     A. L. DE JERSEY     3,058,434
MACHINES FOR COOKING CRUMPETS AND LIKE HOTPLATE GOODS
Filed April 15, 1959     5 Sheets-Sheet 1

Oct. 16, 1962 — A. L. DE JERSEY — 3,058,434
MACHINES FOR COOKING CRUMPETS AND LIKE HOTPLATE GOODS
Filed April 15, 1959 — 5 Sheets-Sheet 5

United States Patent Office 3,058,434
Patented Oct. 16, 1962

3,058,434
MACHINES FOR COOKING CRUMPETS AND LIKE HOTPLATE GOODS
Arthur L. De Jersey, 20 Scheele St., Surrey Hills, Victoria, Australia
Filed Apr. 15, 1959, Ser. No. 806,541
Claims priority, application Australia Apr. 16, 1958
33 Claims. (Cl. 107—4)

This invention relates to machines for cooking crumpets and like hot-plate goods, the term "hot-plate goods" including muffins, pancakes, "favouries," pies such as meat pies and custard tarts normally cooked in moulds, cakes normally cooked in moulds, and like goods cooked in moulds on hotplates. In the following description, reference will be made to the cooking of crumpets, but it is to be understood that the machine described herein is equally adaptable for cooking other hotplate goods with suitable simple mechanical adjustments as may be necessary by the particular nature of the goods.

Crumpet making machines are well known and generally involve the cooking of a comparatively fluid batter or dough mix on travelling hotplates, the machines being characterized by an endless conveyor system or systems in which the hotplates are transversely-disposed and adapted to co-act with transversely-disposed mould-ring plates and caused to travel with intermittent motion through a heating zone for cooking the crumpet dough, the crumpet dough being fed to the mould-ring plates on the hotplates at a dough feeding station at the leading end of the machine, the cooked crumpets being discharged from the machine at the trailing or discharge end after passing through a browning zone which browns the top face of the crumpets, the mould-ring plates being oiled or greased at an oiling or greasing station prior to charging with the crumpet dough to prevent the crumpet dough from adhering to the mould-ring plates when the cooked crumpets are being separated from the mould-ring plates for discharge from the machine.

Machines of this kind in which the mould-ring plates form part of an endless conveyor system disposed above and co-acting with the conveyor system embodying the hotplates for cooking crumpets have the disadvantage that the mould-plates cannot readily be changed whilst the machine is operating to produce a different kind or shape of hot-plate goods; also the mould-ring plates cannot readily be removed and replaced in the case of damage or the necessity to clean them should the products stick or burn in the course of cooking; also, the mould-ring plates tend to overheat in the course of cooking and do not cool sufficiently after discharge of the cooked crumpets and before reaching the dough-charging station, the freshly charged batter in direct contact with the mould-rings overcooking or cooking too quickly which makes the product relatively inferior in quality. The machine of the present invention substantially avoids the above disadvantages.

In accordance with the invention there is provided a machine for making crumpets and the like, comprising an endless conveyor embodying transversely arranged hot-plates and having a substantially horizontal upper stretch which is adapted to carry a succession of mould-ring plates in which crumpet batter or the like is cooked as the mould-ring plates traverse said horizontal upper stretch of the endless conveyor from a leading end to a discharge end of said endless conveyor, an overhead track means disposed above the endless conveyor and arranged so that a leading end of said track means is located above the vicinity of the discharge end of the endless conveyor and a discharge end of said track means is located above the vicinity of the leading end of the endless conveyor, mould-ring plate elevating and loading means near the discharge end of the endless conveyor adapted to elevate the mould-ring plates as they reach the discharge end of the endless conveyor in succession to the leading end of said overhead track means and load them onto said track means in succession at the leading end of the track means, mould-ring plate propelling means associated with said overhead track means and adapted to move the mould-ring plates along said overhead track means in succession to the discharge end of said overhead track means, and mould-ring plate lowering and loading means near the leading end of the endless conveyor adapted to lower the mould-ring plates as they reach the discharge end of the overhead track means in succession to the leading end of the endless conveyor and load them onto said endless conveyor in succession at the leading end of the track means.

According to a practical embodiment of the invention, the machine comprises a main frame supporting an intermittently movable endless conveyor embodying transversely arranged hotplates and having a substantially horizontal upper stretch which is adapted to carry a succession of mould-ring plates in which crumpet batter or the like is cooked, a vertically-disposed loading magazine located above said horizontal upper stretch of the endless conveyor near the leading end and adapted to hold a vertically disposed stack of mould-ring plates, mould-ring plate delivering means synchronised to operate with the intermittent movement of the endless conveyor to deliver each successive lowermost mould-ring plate of said stack from the loading magazine onto the hotplates coincidental with the arrival of each hotplate at the horizontal stretch of the endless conveyor and when stationary, a vertically-disposed receiving magazine located beyond the discharge end of the endless conveyor and above mould-ring plate supporting members extending longitudinally from said discharge end of the endless conveyor in alignment with said horizontal upper stretch the receiving magazine being adapted to receive the mould-ring plates which are slidingly moved along said supporting members by succeeding mould-ring plates reaching the ends of said horizontal stretch, mould-ring plate transferring means synchronised to operate with the intermittent movement of the endless conveyor to transfer each successive mould-ring plate from said supporting members to said receiving magazine when the endless conveyor is stationary, a secondary frame mounted on the main frame and supporting overhead longitudinally extending tracking rails in transverse spaced relationship and connecting the top of the receiving magazine with the top of the loading magazine, and mould-ring plate propelling means associated with said overhead tracking rails and synchronised to operate with the intermittent movement of the endless conveyor whereby the mould-ring plates are moved slidingly the length of said overhead tracking rails so that said mould-ring plates are automatically returned in succession from the receiving magazine to the loading magazine.

The mould-ring plate propelling means in the machine of the invention advantageously comprises longitudinally-extending walker beams in transverse spaced relationship and reciprocated to intermittently propel said mould-ring plates along the overhead track means. The walker beams can be reciprocated both horizontally and vertically while remaining horizontal, said beams having projecting members spaced apart for operative engagement with the mould-ring plates to propel said mould-ring plates along the overhead track means. Reciprocation of the walker beams is conveniently effected by mechanism comprising pairs of links connected to the overhead tracking means and to ends of pairs of bell-crank levers pivotally mounted on the walker beams, the opposite ends of said bell-crank levers being connected to pairs of upstanding lever arms on pairs of walker beam operating spindles carried by bearing plates depending from longitudinally extending structural beams of the secondary frame, and drive means for rotating said walker beam operating spindles.

Operating in conjunction with said mould-ring plates propelling means, according to a preferred practical arrangement of the machine according to the invention, is mould-ring plate discharge means adapted to discharge each successive uppermost mould-ring plate from the stack in the receiving magazine onto the overhead track means for the mould-ring plate propelling means to move said plates slidingly the length of the overhead track means. Said mould-ring plate discharge means advantageously comprises an overhead reciprocal pusher member mounted on the machine at the discharge end for longitudinal reciprocal sliding movement and connected to the walker beams by pivoted actuating arms so as to be reciprocated in timed relationship with the intermittent movement of the endless conveyor so as to move each successive uppermost mould-ring plate from the stack in the receiving magazine onto said overhead track means. For this purpose there can be provided a sub-frame outstanding from the secondary frame at the discharge end of the endless conveyor and extending beyond the receiving magazine, a pair of longitudinally extending slide bars mounted on said sub-frame, a pusher member mounted for reciprocal sliding movement on said slide bars, and pivoted actuating arms connecting the pusher member to the walker beams for discharging each successive uppermost mould-ring plate from the stack in the receiving magazine onto said overhead track means for said mould-ring plate propelling means to move said plates slidingly the length of said overhead track means.

The mould-ring plate delivering means for delivering the mould-ring plates from the stack in the loading magazine onto the hotplates preferably comprises mould-ring plate supporting means for supporting the stack of said plates in position in the loading magazine so that there is a space or clearance between the lowermost plate of the stack and the top of the hotplates in said horizontal stretch, means for actuating the mould-ring plate supporting means so as to release support of said stack of plates when the endless conveyor is stationary for deposit of the lowermost plate onto a hotplate thereabeneath, and mould-ring plate lowering means for lowering the stack of plates so as to deposit said lowermost plate onto said hotplate, said mould-ring plate supporting means automatically re-engaging with the next lowermost plate to support the stack of plates as indicated. In particular, the mould-ring plate delivering means can comprise opposite pairs of pawls pivotally mounted on side faces of the loading magazine and spring loaded to engage with the lowermost plate of the stack for support of the stack, toggle members connected to move the pawls apart for release of said stack in depositing the lowermost plate of said stack onto a hotplate thereabeneath when the endless conveyor is stationary, a pair of reciprocal foot members carried by a pair of vertically disposed rods mounted on outer faces of the loading magazine for vertical reciprocal movement, and means for actuating the toggle members and reciprocating the vertically-disposed rods in timed relationship. The means for reciprocating the vertically disposed rods in timed relationship comprises a pair of primary rocker arms connected at one end to the vertical rods and connected by links at the other end to bell-crank levers having arms carrying rollers in engagement with a cam on a continuously rotatable shaft, and the means for actuating the toggle members comprises a pair of secondary rocker members linked at one end to toggle brackets connecting said toggle members together and slidably mounted on said vertical rods, the other end of said secondary rocker members being disposed to engage periodically with spring-loaded plungers mounted on said links connecting the primary rocker arms to said bell-crank levers.

The mould-ring plate transferring means for successively transferring the mould-ring plates from the hotplates to said receiving magazine preferably comprises mould-ring plate supporting means for supporting the stack of said plates in position in the receiving magazine so that there is a space or clearance between the lowermost plate of the stack and the top of the hotplates in said horizontal stretch, and mould-ring plate lifting means for elevating each mould-ring plate to the bottom of the stack of plates in said receiving magazine and actuating the mould-ring plate supporting means so as to release support of said stack of plates when the endless conveyor is stationary for transferring each mould-ring plate to the bottom of said receiving magazine when each plate is located beneath said magazine, said mould-ring plate supporting means automatically re-engaging with each plate so transferred to the receiving magazine to support the stack of plates as indicated. In particular, the mould-ring plate transferring means can comprise opposite pairs of pawls pivotally mounted on the side faces of the receiving magazine and spring loaded to engage with the lowermost plate of the stack for support of the stack, a transversely-extending elevator plate arranged vertically below said magazine to move the pawls apart for release of said stack in transferring a plate to the bottom of the stack in said receiving magazine when the endless conveyor is stationary, and means for reciprocating the elevator plate in timed relationship. The means for reciprocating the elevator plate in timed relationship may consist of a bell-crank lever arm on a rocker shaft pivotally mounted on the machine frame at the discharge end of the machine and linked to a pair of reciprocating rods which are connected to the ends of the transversely-extending elevator plate, the other end of the bell-crank lever being pivotally connected to a reciprocating bar having a roller which coacts with a cam plate on a transverse drive shaft intermediate the length of the machine.

An electric motor or any other suitable drive means may be embodied in the machine of the invention for moving the endless conveyor and associated mechanism in timed relationship as indicated above, intermittent movement being imparted to the endless conveyor by Geneva-stop means or the like, and the associated mechanism being actuated by chain-drive means or drive shafts and coacting cam means as hereinafter described. The hotplates are conveniently heated by a bank of ignited gas jets located below the substantially horizontal stretch of hotplates and arranged so that the ignited gas impinges on the under face of said hotplates. In addition, the machine conveniently has, as described and illustrated in the specification of Australian Patent No. 154,070, an overhead crumpet-batter supply means near the leading end of the machine for depositing crumpet batter into each successive mould-ring plate passing therebeneath on a hotplate; an overhead crumpet-cooking means near the discharge end of the machine for browning the top of the crumpets; crumpet slicing means near the discharge end of the machine and adapted to engage with the top face of each hotplate so as to slice the cooked crumpets from the hotplates for discharge from the machine; and overhead mould-ring plate cleaning and oiling means for cleaning and oiling the rings of each successive mould-ring plate as the mould-ring plates are intermittently moved along the overhead track means. In this instance, said mould-ring cleaning and oiling means may comprise a plurality of rotary cleaning and oiling brush members carried by arms connected to shafts having toothed pinions geared to a common drive shaft supported by bearing blocks mounted on a cross-bar supported by the overhead track means, the assembly of brushes and associated mechanism being adapted to be lowered in timed relationship with the intermittent movement of the mould-plates so as to brush and oil the inner face of each mould-ring.

In order, however, that the invention may be fully understood, reference is made to the accompanying drawings, which are part of this specification, and in which.

Referring to the drawings, the machine of the invention is shown to comprise an intermittently movable endless conveyor 1 embodying transversely arranged hotplates 2 in side-by-side relationship and disposed so as to form a substantially horizontal upper stretch 3, which stretch of hotplates is adapted to carry a succession of mould-ring plates 4 in which crumpet batter or the like is cooked. A vertically-disposed loading magazine 5 is located above said horizontal upper stretch of hotplates near the leading end 6 of the machine and is adapted to hold a stack of the mould-ring plates 4. Mould-ring plate delivery means 7 successively delivers the mould-ring plates from the stack in the loading magazine 5 onto the hotplates, a mould-ring plate being placed on each successive hotplate. A vertically-disposed receiving magazine 8 is located above said horizontal stretch of hotplates near the discharge end 9 of the machine and is adapted to hold a stack of the mould-ring plates. Mould-ring plate transferring means 10 successively transfer the mould-ring plates from the hotplates to the receiving magazine 8. Overhead longitudinally-extending track means 11 connects the receiving magazine 8 with the loading magazine 5. Mould-ring plate discharge means 12 pushes the uppermost of said plates from the top of the receiving magazine 8 to mould-ring plate propelling means 13 which is associated with said overhead track means and automatically moves the mould-ring plates the length of the overhead track means to return said plates in succession from the receiving magazine 8 to the loading magazine 5. The arrangement is such that delivery of the mould-ring plates from the loading magazine 5 to the hotplates at the leading end 6, transfer of said plates from the hotplates at the discharge end 9 to the receiving magazine 8, and return of said plates from the receiving magazine 8 to the loading magazine 5, all occur in timed relationship with the intermittent movement of the endless conveyor 1, as hereinafter more fully described.

The illustrated machine comprises a main frame 14 which may consist of two pairs of pedestal supports 15 and 16 forming respectively the leading end 6 and discharge end 9 of the machine, connected together in longitudinal spaced relationship by pairs of longitudinal beams 17, and connected together in transverse spaced relationship by transverse bars 18. Connected to the inner faces of the pairs of pedestals 15 and 16 at both ends of the machine is a pair of upper and lower conveyor-chain guide-rails 19 on both sides of the machine. A pair of endless conveyor chains 20 having upper and lower horizontal stretches, track on said pairs of upper and lower conveyor-chain guide-rails 19. The conveyor chains 20 extend around sprocket wheels 21 at the leading end 6 and discharge end 9 of the machine, the shafts of the sprocket wheels being mounted in bearings in said pedestals 15 and 16. Hotplates 2 in side-by-side relationship are suitably connected at their ends to links of the conveyor chains 20 so as to extend transversely of the machine and form an endless series. The assembly of hotplates 2 and conveyor chains 20 are adapted to be moved intermittently by electric motor or other suitable motive means and associated mechanism including a Geneva-stop wheel 22 mounted on a shaft 23. The main drive shaft 26 carries a toothed pinion 24 which engages with a spur wheel 25 on a primary driving shaft 43 at the leading end of the machine for operating the Geneva-stop wheel 22 thereby imparting intermittent motion to the shaft carrying the conveyor-chain sprocket wheels 21. The hotplates can be heated by banks of ignited gas from jets 27 impinging on the under face of the upper stretch of hotplates, the gas being conveyed to the jets 27 by pipes from a gas main at one side of the machine.

Each hotplate 2 is adapted to receive a mould-ring plate 4 in timed relationship with the arrival of each hotplate at the upper stretch 3 at the leading end of the machine. The mould-ring plates 4 may embody a series of ring members so as to mould crumpet batter into crumpet form, said mould-plates having outstanding lugs 28 at both ends. The mould-ring plates 4 are adapted to be delivered onto the hotplates 2 in register with the hotplates, in side-by-side relationship extending transversely of the machine.

Located at the leading end of the machine is the loading magazine 5 comprising a pair of oppositely-disposed channel members 29 supported by columns connected to the pedestals 15, the lugs 28 at the ends of the mould-ring plates 4 being housed in said channel members 29. The stack of mould-ring plates in the loading magazine 5 is held by pairs of spring-loaded pawls 30 pivotally mounted on side plates 31 sidewardly extending from the channel members 29 and adapted to be moved apart by a pair of toggle members 32, the toggle assemblies being slidably mounted on vertical rods 33 in turn mounted for reciprocal movement on the outer faces of the channel members 29. A pair of primary rocker arms 34 are pivotally mounted on the pedestals 15 and are connected by a pair of links 36 to mechanism for rocking the arms 34 as hereinafter described. Said links 36 have mounted thereon spring loaded plungers 35 which engage with secondary rocker members 37 to actuate the toggle assemblies in timed relationship with the rocking of the primary rocker arms 34. The secondary rocker members 37 are connected by a pair of links 38 to a pair of toggle brackets or collars which are slidably mounted on the vertical rods 33 and have the toggle members 32 attached, as shown in the drawings. Arms 34 are similarly connected to a pair of collars on the upper ends of rods 33. Each vertical rod 33 has a foot member 39 which rises in unison in the course of the reciprocating movement of the rod 33 so as to engage with the lowermost mould-ring plate of the stack in the loading magazine 5, simultaneously with said pairs of pawls 30 being moved apart, thereby to support said stack, each foot 39 thence lowering in unison so as to deposit said lowermost mould-ring plate onto a hotplate which has arrived in position therebeneath, in timed relationship, said pawls 30 returning automatically under the spring-loading and toggle movement so as to engage the next lowermost mould-ring plate in the stack of mould-ring plates and thereby hold said stack of mould-ring plates in position in the loading magazine 5. Mechanism for rocking said pair of primary rocker arms 36 can comprise a pair of bell-crank levers 40 pivotally mounted on said pedestals 15, one end of each said bell-crank lever 40 being connected to link 36 carrying the spring-loaded plunger 35 whilst the other end of said bell-crank lever 40 is connected to a bifurcated arm 41 carrying a roller for engagement with a cam 42 on a continuously rotating shaft 43 at the leading end 6 of the machine.

Located at the discharge end 9 of the machine is the mould-ring plate receiving magazine 8 and comprises a pair of vertically disposed channel members 44 supported by columns connected to the pedestals 16, the lugs 28 at the ends of the mould-ring plates 4 being housed in said channel members. The stack of mould-ring plates 4 in the receiving magazine 8 is held by a pair of spring-loaded pawls 45 pivotally mounted on side plates 46 sidewardly from the channel members 44 and adapted to be moved apart by a transversely-extending elevator plate 47 arranged below the receiving magazine 8 in vertical alignment. Said elevator plate 47 is adapted to be reciprocated in timed relationship and elevate each successive mould-ring plate moved into position beneath the receiving magazine 8 by succeeding mould-ring plates leaving the endless conveyor horizontal stretch 3 at the discharge end of the machine, the mould-ring plates sliding along supporting members 48, into said position. Reciprocating movement is imparted to said elevator plate 47 by a bell-crank lever 49 on a rocker shaft 50, pivotally mounted on the machine frame and connected by links 51 to a pair of reciprocating rods which are mounted in bearings on channel members 44, the ends of the elevator plate 47 being connected to said reciprocating rods by adjustable collars. The other end of the bell-crank lever 49 is pivotally connected to a reciprocating bar 52 having a roller coacting with the cam plate 53 on an intermediate transverse drive shaft 54. Said intermediate drive shaft 54 is itself driven by a main longitudinal drive shaft extending lengthwise of the machine main frame 14, at one side, and having bevel gears coacting with bevel gears on a continuously-rotating subsidiary drive shaft (not shown) at the leading end 6 of the machine.

Figure 1A:
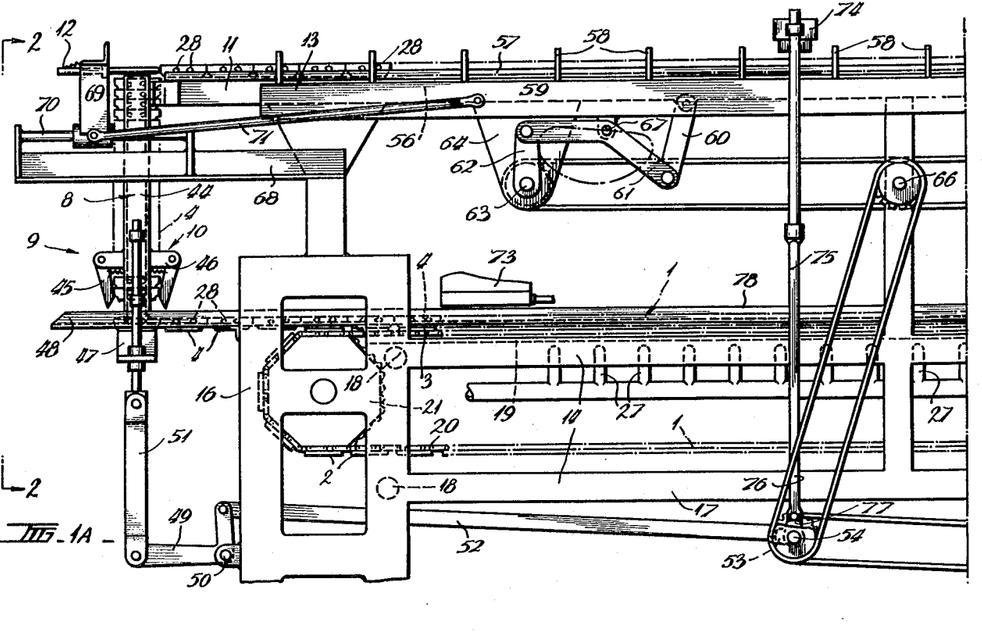
FIG. 1A is a front elevational view of one side of the discharge end of a machine in accordance with the invention.
Figure 1B:
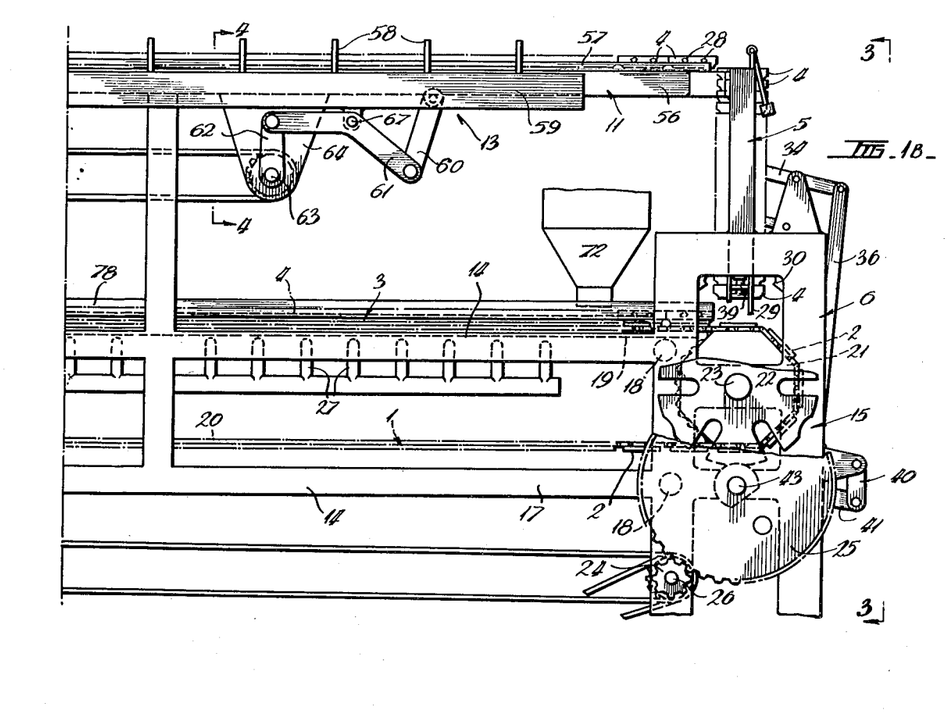
FIG. 1B is a front elevational view of the same side of the machine as shown in FIG. 1A but as seen from the leading end of the machine.
Figures 2, 6:
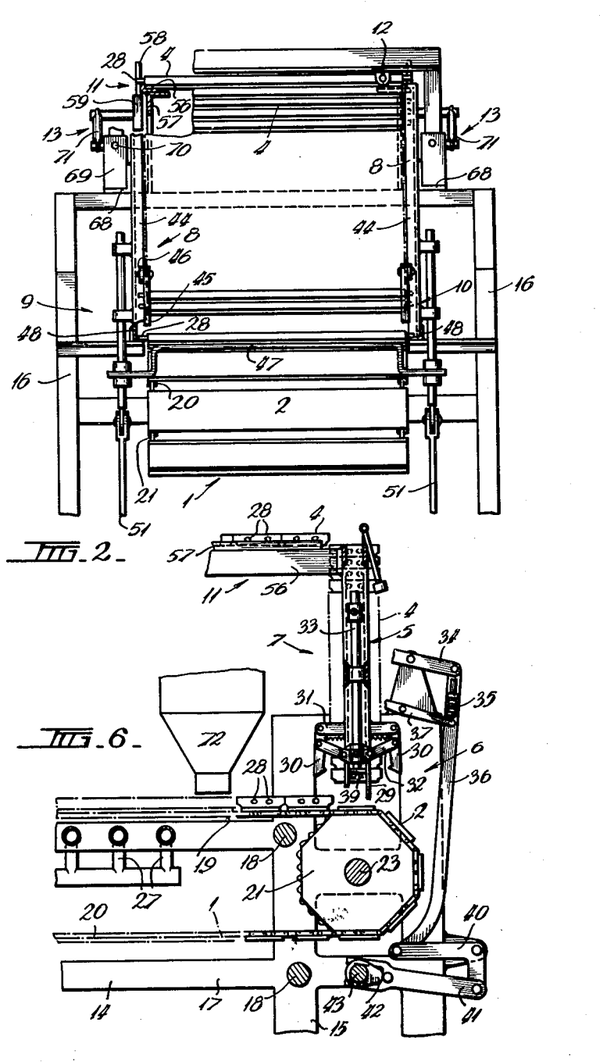
FIG. 2 is an end view taken at lines 2—2 of FIG. 1A.
FIG. 6 is a cross-sectional detail view taken at lines 6—6 of FIG. 3.
Figures 3, 4, 5:
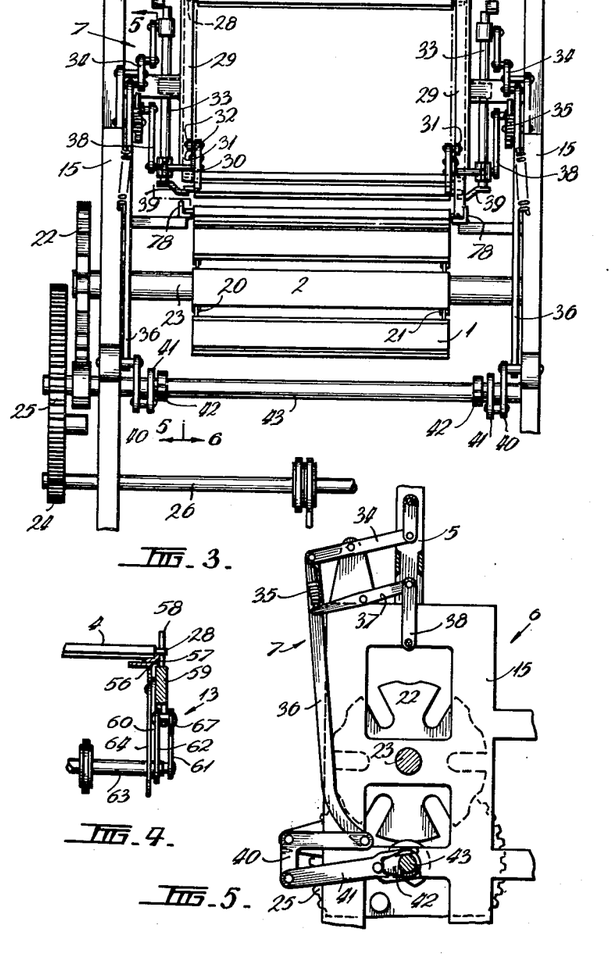
FIG. 3 is an end view taken at lines 3—3 of FIG. 1B.
FIG. 4 is a cross-sectional detail view taken at lines 4—4 of FIG. 1B.
FIG. 5 is a cross-sectional detail view taken at lines 5—5 of FIG. 3.

A secondary frame 56 is mounted on the main frame 14 and supports a pair of longitudinally-disposed tracking rails 57 in transversely spaced relationship, said rails being mainly supported by transverse beams connected to pairs of columns upstanding from the main frame 14 at both sides at suitable intervals the legnth of the main frame. The mould-ring plates are adapted to be moved slidingly along said tracking rails intermittently, the outstanding lugs 28 of said plates protruding beyond said tracking rails on both sides and coacting with a series of projecting members 58, upstanding from walker beam members 59 disposed at each side of the longitudinally-extending tracking rails 57. The motion of the walker beams 59 is forwards and down, and, backwards and up, said beams remaining horizontal, so as to simultaneously push all the mould-ring plates on the tracking rails a predetermined distance the length of said tracking rails intermittently, in timed relationship with the intermittent movement of the endless conveyor and hotplates assembly. The mechanism for moving the walker beams 59 consists of pairs of links 60 pivotally connected to the tracking rails 57 and to ends of pairs of bell-crank levers 61 pivotally mounted on the walker beams 59, the opposite ends of the bell-crank levers 61 being connected to pairs of upstanding lever arms 62 and pairs of walker beam operating spindles 63 supported by bearing plates or hangers 64 depending from longitudinal structural beams of the secondary frame 56. The walker beam operating spindles 63 are chain driven by a walker beam main drive shaft 66 disposed about midway the length of the machine and supported by columns forming part of the secondary frame 56. Said main drive shaft 66 is in turn chain driven by the main driving mechanism of the machine. The spindles 63 make one complete revolution in unison for each intermittent movement of the endless conveyor 1 whereby each bell-crank lever pivot pin 67 on the walker beams 59 is moved through an inclined elliptical path as indicated in broken lines in FIG. 1A, so that the projecting members 58 are collectively moved similarly thereby to propel the mould-ring plates slidingly along the tracking rails 57 intermittently as indicated.

A sub-frame 68 outstands from the secondary frame 56 at the discharge end of the machine, and the mould-ring plate discharge means 12 is mounted thereon for pushing each uppermost mould-ring plate of the stack in the receving magazine 8 onto the tracking rails 57 into engagement with the projecting members 58 of the walker beams 59. Reciprocating pusher member 69 is slidably mounted on a pair of slide bars 70 supported by the sub-frame 68 for the purpose, said pusher member 69 being reciprocated by actuating arms 71 pivotally attached to both the pusher member and the walker beams 59.

Crumpet batter measuring and depositing mechanism 72, which is of known construction as shown in Australian Patent No. 154,070 is located at the leading end of the machine and may comprise an overhead hopper with valve assembly, said valve assembly conveniently consisting of a battery of measuring and discharge valves adapted to deposit a row of measured amounts of batter from the hopper so as to lodge in the rings of the mould-ring plates on each hotplate as the hotplates pass beneath the hopper, means being provided for operating the battery of measuring and discharge valves in timed relationship with the intermittent movement of the endless conveyor so as to deposit the batter in the mould-rings when the hotplates are stationary. Batter in the hopper is drawn through outlet ports in the hopper into a series of chambers in the valve assembly by means of outward movement of plungers drawn by links which are actuated through lever arms coacting with cams on a drive shaft bevel geared to the main longitudinal drive shaft. During the filling of each chamber, the valves are open to inward flow but closed to discharge. After filling of the chambers the valves are turned to bring inlet ports of the valves out of register with the outlet ports of the hopper and to bring discharge ports of the valves into register with discharge ports of the chambers. Turning of the valves is effected by lever and link means operated by the cams on the drive shaft geared to the main longitudinal drive shaft. When the chambers have been filled and the valves turned to the discharge position, the plungers are then moved inwards and force the batter from the chambers through the discharge ports so that the batter is deposited onto the hotplate immediately positioned beneath. The quantity of batter fed to the mould-ring plates can be varied by adjusting the outward stroke of the plungers by means of a screw-adjusted stop, a compression spring being provided to compensate the movement of the links operating them.

Located near the discharge end of the machine is a crumpet-browning means 73, which is of known construction as shown in Australian Patent No. 154,070. Said means may consist of a heat-reflector browning member heated by ignited gas jets suitably supplied with gas. The browning member can be reciprocated vertically by an eccentric which through spring loading actuates a pivoted link and a vertical link which is connected to a squared rod moving in a slideway and attached to the browning plate, or, the browning member may be simply pivotally supported by the main frame for pivotal movement to and from the hotplates. Each row of crumpets is heated by the browning member during two periods of rest before passing to crumpet slicing or separating mechanism at the discharge end of the machine for removing the cooked crumpets from the hotplates.

Figure 8:
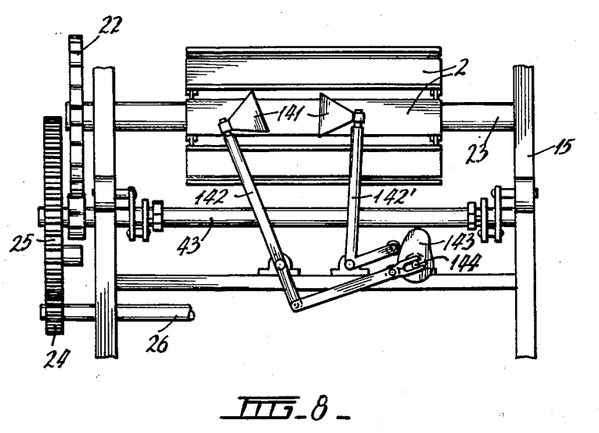
FIG. 8 shows schematically a slicing and scraping mechanism for use with the apparatus of the invention.

The crumpet slicing or separating mechanism, which is of known construction as specified above and shown in FIG. 8, may comprise scraping blades 141 swung backwards and forwards by pivoted lever arms 142 and 142' for sliding engagement with each hotplate 2 at the discharge end of the machine, said pivoted lever arms being actuated by a cam 143 on a shaft 144 driven from the main driving shaft of the machine. The timing of the movements of the blades is such that the blades do not clash but their paths of movement overlap so that the crumpets are effectively separated from each hotplate. The blades may be provided with spring loaded universal joints to follow the surfaces of the hotplates effectively, even if slight distortion has occurred. The crumpets then fall onto a continuously moving secondary endless conveyor for discharge from the machine and cooling ready for packaging as desired.

Figure 7:
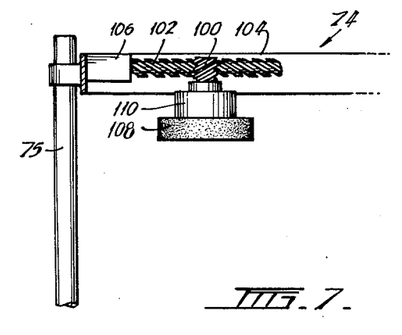
FIG. 7 shows schematically a cleaning and oiling mechanism.

Intermediate the length of the machine and disposed above the pair of transverse tracking rails 57 is cleaning and oiling mechanism 74, which is of known construction as in Australian Patent No. 154,070, for example, for cleaning and oiling the rings of each mould-ring plate. This mechanism may comprise a plurality of rotary cleaning and oiling brush members (one of which is shown in FIG. 7) carried by arms connected to shafts having toothed pinions 100 geared to a common drive shaft 102 supported by bearing blocks mounted on a cross bar 104 supported by the overhead tracking rails. The drive shaft is suitably rotated by drive means 106 and the assembly is suitably supported by the secondary frame 56. An oil reservoir 110 feeds brush 108. The assembly of brushes 108 and rotating mechanism is adapted to be lowered so that the brushes clean the face of each mould ring in timed relationship with the intermittent movement of the muold-ring plates along the length of the tracking rails 57, as each mould-ring plate arrives beneath the assembly, said assembly being moved upwards so that the cleaning brushes are clear of the mould-ring plates to allow each cleaned and oiled plate to be moved forward by the walker beams 59. Up and down movement of this assembly is effected by a rod 75 having a cam member 76 coacting with a cam plate 77 on the intermediate drive shaft 54.

In travelling the length of the horizontal stretch of hotplates, the mould-ring plates are conveniently kept in register with the hotplates by a pair of guide-bars 78 which extend parallel with the sides of the upper horizontal stretch of endless conveyor chains, the mould-ring plates being arranged so as to be substantially free from contact with the guide bars 78 (except when a hotplate temporarily loses register with a mould-ring plate and this is corrected by the guide bars) until the hotplate and mould-ring plates reach the discharge end of the machine. At this point the guide-bars 78 extend into the supporting members 48.

Operation of the machine in accordance with the invention is substantially as follows. The gas jets or other heating means are ignited and allowed to heat the hotplates to a sufficient degree, the endless conveyor being set in motion during this pre-heating period to allow all of the hotplates to be heated to the requisite degree. The loading magazine and the receiving magazine are then each charged with a stack of mould-ring plates and the machine as a whole set in motion, further mould-ring plates being fed into the overhanging portion of the overhead track at the discharge end of the machine as necessary after the mould-ring plates in the receiving magazine have been discharged on to the overhead tracking rails. When the overhead tracking rails, and loading magazine, and horizontal stretch of the hotplates, and receiving magazine are fully loaded with the mould-ring plates, crumpet batter is deposited into the rings of the mould-ring plates. After the batter charged mould-ring plates have traversed the lentgh of the horizontal stretch of hotplates and the crumpets thereby cooked, the mould-ring plates separate from the crumpets, which adhere to the hotplates, by traversing the supporting members leading from the discharge end of the conveyor to the receiving magazine where each mould-ring plate is successively lifted into position and stacked beneath the lowermost mould-ring plate already in the receiving magazine, whilst the crumpets are sliced or separated from the hotplates as indicated above. In stacking each mould-ring plate into the receiving magazine, the uppermost mould-ring plate already in said magazine is elevated to a plane in line with the overhead tracking rails where the pusher member engages with said mould-ring plate and moves the mould-ring plate into engagement with the walker beams for sliding movement the length of the overhead track to the loading magazine. Each mould-ring plate then progressively descends the loading magazine, and, upon reaching the lowermost position, is loaded onto a hotplate located immediately therebeneath. This procedure follows endlessly for as long as the machine is to be operated in utilizing a selected set of mould-ring plates. The timing of these movements in the machine illustrated is such that as the lowermost mould-ring plate in the loading magazine is deposited on a hotplate stationary therebeneath, the walker beams move forward and push a mould-ring plate from the tracking rails onto the uppermost position at the top of the stack of mould-ring plates in said magazine, whilst, at the discharge end of the machine the mould-ring plate which has been moved into position beneath the receiving magazine is lifted upwards and held by the pawls, the pusher member being operated simultaneously to push forward the uppermost mould-ring plate in said magazine, thereby elevated into position in alignment with the tracking rails, all such movements taking place when the endless conveyor is stationary. The crumpet-batter feeding mechanism, and the crumpet-separating mechanism, and the mould-ring cleaning and oiling mechanism are also brought into operation when the endless conveyor is stationary.

The principal feature of this invention is the provision of the open-ended overhead track means, which, in association with the loading and receiving magazines, the means for depositing the mould-ring plates from the loading magazine onto the hotplates, the means for transferring the mould-ring plates to the receiving magazine, and the mould-ring plate propelling means for moving the mould-ring plates lengthwise of the overhead track, provides a number of advantages in use. Thus, the arrangement is such that mould-ring plates depositing means at the base of the loading magazine can be disconnected from operation to allow mould-ring plates to slide over the top of the stack in said magazine and move to the end of the overhead track either at the end of the cooking period or at the pre-heating period, thereby avoiding unnecessary over-heating of the mould-ring plates, which otherwise is detrimental in that the oil applied thereto is vaporized, or residual dough matter adhering thereto is carbonized, which makes it difficult to clean the mould-ring plates. The arrangement is also such that it is readily possible to replace a set of mould-ring plates with a different set, the original set of mould-ring plates being taken off the overhead track at the leading end of the machine progressively, as indicated, as the new set of mould-ring plates are fed onto the overhead track at the discharge end of the machine. Mould-ring plates thus can be removed or replaced in the case of damage or cleaned in the event of sticking of the mould-ring plates or burning of residual dough matter; also, different shapes or sizes of mould-ring plates can be introduced as desired; also, where hotplate goods are to be manufactured which do not require the use of mould-ring plates, for example, in the cooking of pancakes or "favories" and the like without mould-rings, such mould-ring plates can be readily removed from the machine.

I claim:

1. A machine for making crumpets and the like, comprising an endless conveyor embodying transversely arranged hot-plates and having a substantially horizontal upper stretch which is adapted to carry a succession of mould-ring plates in which crumpet batter or the like is cooked as the mould-ring plates traverse said horizontal upper stretch of the endless conveyor from a leading end to a discharge end of said endless conveyor, an overhead track means disposed above the endless conveyor and arranged so that a leading end of said track means is located above the vicinity of the discharge end of the endless conveyor and a discharge end of said track means is located above the vicinity of the leading end of the endless conveyor, mould-ring plate elevating and loading means near the discharge end of the endless conveyor adapted to elevate the mould-ring plates as they reach the discharge end of the endless conveyor in succession to the leading end of said overhead track means and load them on to said track means in succession at the leading end of the track means, mould-ring plate propelling means associated with said overhead track means and adapted to move the mould-ring plates along said overhead track means in succession to the discharge end of said overhead track means, and mould-ring plate lowering and loading means near the leading end of the endless conveyor adapted to lower the mould-ring plates as they reach the discharge end of the overhead track means in succession to the leading end of the endless conveyor and load them on to said endless conveyor in succession at the leading end of the endless conveyor.

2. A machine for making crumpets and the like, comprising an endless conveyor embodying transversely arranged hot-plates and having a substantially horizontal upper stretch which is adapted to carry a succession of mould-ring plates in which crumpet batter or the like is cooked as the mould-ring plates traverse said horizontal upper stretch of the endless conveyor from a leading end to a discharge end of said endless conveyor, an overhead longitudinally-extending track means disposed above the endless conveyor and arranged so that a leading end of said track means is located above the vicinity of the discharge end of the endless conveyor and a discharge end of said track means is located above the vicinity of the leading end of the endless conveyor, a mould-ring plate loading magazine disposed between said horizontal upper stretch of the endless conveyor near the leading end thereof and the discharge end of said track means and adapted to hold a stack of mould-ring plates, mould-ring plate delivering means associated with said loading magazine and adapted to load the mould-ring plates in said stack in succession on to each successive hot-plate reaching said horizontal upper stretch at the leading end of the endless conveyor, a mould-ring plate receiving magazine disposed between said horizontal upper stretch of the endless conveyor near the discharge end thereof and the leading end of said track means and adapted to hold a stack of mould-ring plates, mould-ring plate elevating and loading means adapted to transfer each successive mould-ring plate from the hot-plates to said receiving magazine as they reach the discharge end of the endless conveyor and elevate them in succession to the leading end of said overhead track means and load them on to said track means in succession at the leading end of the track means, and mould-ring plate propelling means associated with said overhead track means and adapted to move the mould-ring plates along said overhead track means in succession from the receiving magazine to the loading magazine.

3. A machine for making crumpets and the like comprising an intermittently movable endless conveyor embodying transversely arranged hot-plates and having a substantially horizontal upper stretch which is adapted to carry a succession of mould-ring plates in which crumpet batter or the like is cooked as the mould-ring plates traverse said horizontal upper stretch of the endless conveyor from a leading end to a discharge end of said endless conveyor, means for driving the endless conveyor intermittently, overhead longitudinally-extending tracking rails in transversely spaced relationship disposed above the endless conveyor and arranged so that a leading end of said tracking rails is located above the vicinity of the discharge end of the endless conveyor and a discharge end of said tracking rails is located above the vicinity of the leading end of the endless conveyor, a vertically disposed mould-ring plate loading magazine located between said horizontal upper stretch of the endless conveyor near the leading end thereof and the discharge end of said tracking rails and adapted to hold a vertical stack of mould-ring plates, mould-ring plate delivering means associated with said loading magazine and operative with the intermittent movement of the endless conveyor to load each successive lowermost mould-ring plate in the loading magazine on to each successive hot-plate coincidental with the arrival of each hot-plate at said horizontal stretch of the endless conveyor at the leading end thereof and when said endless conveyor is stationary, a vertically disposed mould-ring plate receiving magazine located between said horizontal upper stretch of the endless conveyor near the discharge end thereof and the leading end of said tracking rails, and adapted to hold a vertical stack of mould-ring plates, mould-ring plate elevating and loading means associated with said receiving magazine and operative with the intermittent movement of the endless conveyor to transfer successive mould-ring plates from the hot-plates to said receiving magazine as they reach the discharge end of the endless conveyor and elevate them in succession to the leading end of said tracking rails and load each successive upperpost-mould-ring plate on to said tracking rails in succession at the leading end of the tracking rails, and mould-ring plate propelling means associated with said tracking rails and operative with the intermittent movement of the endless conveyor to move the mould-ring plates along said tracking rails in succession from the receiving magazine to the loading magazine.

4. A machine according to claim 3 wherein said mould-ring plate delivering means comprises mould-ring plate supporting means adapted to support the stack of mould-ring plates in position in the loading magazine so that there is a clearance between the bottom of the lowermost mould-ring plate of the stack and the top of the hot-plates in said horizontal stretch, means adapted to actuate the mould-ring plate supporting means to release support of said stack of mould-ring plates when the endless conveyor is stationary for loading of the lowermost mould-ring plate on to a hot-plate therebeneath, and mould-ring plate lowering means adapted to lower the stack of mould-ring plates to load said lowermost plate on to said hot-plate, said mould-ring plate supporting means adapted to automatically re-engage with the next lowermost mould-ring plate and support the stack of mould-ring plates as specified.

5. A machine according to claim 4, wherein said mould-ring plate lowering means and loading means comprise opposite pairs of pawls pivotally mounted on side faces of the loading magazine and spring-loaded to engage with the lowermost mould-ring plate of the stack for support of the stack, toggle members connected to move the pawls apart for release of said stack in depositing the lowermost plate of said stack on to a hot-plate therebeneath, a pair of reciprocal foot members carried by a pair of vertically disposed rods mounted on outer faces of the loading magazine for vertical reciprocal movement, and means adapted to actuate the toggle members and reciprocate the vertically disposed rods in timed relationship.

6. A machine according to claim 5, wherein said means adapted to reciprocate the vertically disposed rods in timed relationship comprises a pair of primary rocker arms connected at one end to the vertical rods and connected by links at the other end to bell-crank levers having arms carrying rollers in engagement with a cam on a continuously rotatable shaft, and wherein said means adapted to actuate the toggle members comprises a pair of secondary rocker members linked at one end to toggle brackets connecting said toggle members together and slidably mounted on said vertical rods, the other end of said secondary rocker members being disposed to engage periodically with spring-loaded plungers mounted on said links connecting the primary rocker arms to said bell-crank levers.

7. A machine according to claim 3, wherein said mould-ring plate elevating and loading means comprises mould-ring plate supporting means adapted to support the stack of mould-ring plates in position in the receiving magazine so that there is a clearance between the bottom of the lowermost mould-ring plate of the stack and the top of the hot-plates in said horizontal stretch, mould-ring plate lifting means adapted to elevate each mould-ring plate and actuate said mould-ring plate supporting means so as to disengage from said stack of mould-ring plates for the transfer of each successive mould-ring plate to the bottom of said receiving magazine when each successive mould-ring plate is located beneath said magazine, said mould-ring plate supporting means being adapted to automatically re-engage with each mould-ring plate transferred to the receiving magazine to support the stack of mould-ring plates, and mould-ring plate loading means adapted to move each successive uppermost mould-ring plate from the stack in the receiving magazine on to said overhead tracking rails in to a position ready for engagement with said mould-ring plate propelling means.

8. A machine according to claim 7, wherein said mould-ring plate supporting means comprises opposite pairs of pawls pivotally mounted on side faces of the receiver magazine and spring-loaded to engage with the lowermost mould-ring plate of the stack and support the stack, the mould-ring plate lifting means comprises a transversely extending elevator plate disposed below said receiver magazine and adapted to move said pawls apart for transfer of a mould-ring plate to the bottom of the stack in said receiving magazine and having means for reciprocating the elevator plate in timed relationship, and said mould-ring plate loading means comprises a reciprocal pusher member adapted to move each successive uppermost mould-ring plate from the stack in the receiving magazine on to said overhead tracking rails in timed relationship.

9. A machine according to claim 8, wherein the means for reciprocating the elevator plate in timed relationship comprises a bell-crank lever arm on a rocker shaft and linked at one end to a pair of reciprocating rods which are connected to the ends of the transversely-extending elevator plate, the other end of the bell-crank lever arm being pivotally connected to a reciprocating bar having a roller which coacts with a cam plate on a transverse drive shaft.

10. A machine according to claim 3, wherein said mould-ring plate propelling means comprises a pair of reciprocal beams disposed in transversely spaced relationship to the overhead tracking rails and adapted to intermittently propel said mould-ring plates along said overhead tracking rails.

11. A machine according to claim 10, wherein the pair of beams are walker beams adapted to be reciprocated horizontally and vertically while themselves remaining substantially horizontal, said beams having upstanding members spaced apart for operative engagement with the mould-ring plates to propel said mould-ring plates along the overhead tracking rails.

12. A machine according to claim 11, wherein said walker beams are reciprocated by mechanism comprising pairs of links connected to the overhead tracking rails and to one end of pairs of bell-crank levers pivotally mounted on the walker beams, the opposite end of said bell-crank levers being connected to pairs of upstanding lever arms on pairs of walker-beam operating spindles, and drive means for rotating said walker-beams operating spindles.

13. A machine according to claim 3, in combination with a main frame supporting said intermittently movable endless conveyor and drive means, a secondary frame mounted on the main frame and supporting said overhead tracking rails, and a sub-frame outstanding from the secondary frame at the discharge end of the endless conveyor and extending beyond said mould-ring plate receiving magazine, a pair of longitudinally extending slide bars being mounted on said sub-frame and a mould-ring plate pusher member mounted for reciprocal sliding movement on said slide bars and adapted to move each successive uppermost mould-ring plate from the stack in the receiving magazine on to said overhead tracking rails into a position ready for said mould-ring plate propelling means to move said plates along the overhead tracking rails from said receiving magazine to said loading magazine.

14. A machine according to claim 13, wherein said mould-ring plate pusher member is connected by pivoted actuating arms to a pair of reciprocal beams disposed in transversely spaced relationship to the overhead tracking rails, said beams being adapted to intermittently propel said mould-ring plates along the overhead tracking rails from said receiving magazine to said loading magazine and also being adapted to reciprocate said pusher member.

15. A machine according to claim 14, wherein the pair of beams are walker beams adapted to be reciprocated horizontally and vertically while themselves remaining substantially horizontal, said beams having upstanding members spaced apart for operative engagement with the mould-ring plates to propel said mould-ring plates along the overhead tracking rails.

16. A machine according to claim 13, wherein said mould-ring plate pusher member is connected by pivoted actuating arms to a pair of substantially horizontal walker beams disposed in transversely spaced relationship to the overhead tracking rails and adapted to be reciprocated horizontally and vertically while themselves remaining substantially horizontal, said beams having upstanding members spaced apart for operative engagement with the mould-ring plates to intermittently propel said mould-ring plates along the overhead tracking rails from said receiving magazine to said loading magazine and also being adapted to reciprocate said pusher member, and mechanism for reciprocating said walker beams comprising pairs of links connected to the overhead tracking rails and to an end of pairs of bell-crank levers pivotally mounted on the walker beams, the opposite end of said bell-crank levers being connected to pairs of upstanding lever arms on pairs of walker-beam operating spindles carried by bearing plates depending from longitudinally-extending structural beams of the secondary frame, and drive means for rotating said walker-beam operating spindles.

17. A machine according to claim 3, wherein said mould-ring plate lowering and delivering means comprises mould-ring plate supporting means adapted to support the stack of mould-ring plates in position in the loading magazine so that there is a clearance between the bottom of the lowermost mould-ring plate of the stack and the top of the hot-plates in said horizontal stretch, means adapted to actuate the mould-ring plate supporting means to release support of said stack of mould-ring plates when the endless conveyor is stationary for loading of the lowermost mould-ring plate on to a hot-plate therebeneath, and mould-ring plate lowering means adapted to lower the stack of mould-ring plates to load said lowermost plate on to said hot-plate, said mould-ring plate supporting means adapted to automatically re-engage with the next lowermost mould-ring plate and support the stack of mould-ring plates and wherein said mould-ring plate elevating and loading means comprises mould-ring plate supporting means adapted to support the stack of mould-ring plates in position in the receiving magazine so that there is a clearance between the bottom of the lowermost mould-ring plate of the stack and the top of the hot-plates in said horizontal stretch, mould-ring plate lifting means adapted to elevate each mould-ring plate and actuate said mould-ring plate supporting means so as to disengage from said stack of mould-ring plates for the transfer of each successive mould-ring plate to the bottom of said receiving magazine when each successive mould-ring plate is located beneath said magazine, said mould-ring plate supporting means being adapted to automatically re-engage with each mould-ring plate transferred to the receiving magazine to support the stack of mould-ring plates and mould-ring plate loading means adapted to move each successive uppermost mould-ring plate from the stack in the receiving magazine on to said overhead tracking trails in to a position ready for engagement with said mould-ring plate propelling means.

18. A machine according to claim 3, wherein said mould-ring plate lowering and delivering means comprises mould-ring plate supporting means adapted to support the stack of mould-ring plates in position in the loading magazine so that there is a clearance between the bottom of the lowermost mould-ring plate of the stack and the top of the hot-plates in said horizontal stretch, means adapted to actuate the mould-ring plate supporting means to release support of said stack of mould-ring plates when the endless conveyor is stationary for loading of the lowermost mould-ring plate on to a hot-plate therebeneath, and mould-ring plate lowering means adapted to lower the stack of mould-ring plates to load said lowermost plate on to said hot-plate, said mould-ring plate supporting means adapted to automatically re-engage with the next lowermost mould-ring plate and support the stack of mould-ring plates as specified, wherein said mould-ring plate elevating and loading means comprises mould-ring plate supporting means adapted to support the stack of mould-ring plates in position in the receiving magazine so that there is a clearance between the bottom of the lowermost mould-ring plate of the stack and the top of the hot-plates in said horizontal stretch, mould-ring plate lifting means adapted to elevate each mould-ring plate and actuate said mould-ring plate supporting means so as to disengage from said stack of mould-ring plates for the transfer of each successive mould-ring plate to the bottom of said receiving magazine when each successive mould-ring plate is located beneath said magazine, said mould-ring plate supporting means being adapted to automatically re-engage with each mould-ring plate transferred to the receiving magazine to support the stack of mould-ring plates as specified, and mould-ring plate loading means adapted to move each successive uppermost mould-ring plate from the stack in the receiving magazine on to said overhead tracking rails in to a position ready for engagement with said mould-ring plate propelling means, and wherein said mould-ring plate propelling means comprises a pair of reciprocal beams disposed in transversely spaced relationship to the overhead tracking rails and adapted to intermittently propel said mould-ring plates along said overhead tracking rails.

19. A machine for making crumpets and the like comprising an intermittently movable endless conveyor embodying transversely arranged hot-plates and having a substantially horizontal upper stretch which is adapted to carry a succession of mould-ring plates in which crumpet batter or the like is cooked as the mould-ring plates traverse said horizontal upper stretch of the endless conveyor from a leading end to a discharge end of said endless conveyor, means for driving the endless conveyor intermittently, overhead longitudinally-extending tracking rails in transversely spaced relationship disposed above the endless conveyor and arranged so that a leading end of said tracking rails is located above the vicinity of the discharge end of the endless conveyor and a discharge end of said tracking rails is located above the vicinity of the leading end of the endless conveyor, a vertically disposed mould-ring plate loading magazine located between said horizontal upper stretch of the endless conveyor near the leading end thereof and the discharge end of said tracking rails and adapted to hold a vertical stack of mould-ring plates, mould-ring plate delivering means associated with said loading magazine and operative with the intermittent movement of the endless conveyor to load each successive lowermost mould-ring plate in the loading magazine onto each successive hot-plate coincidental with the arrival of each hot-plate at said horizontal stretch of the endless conveyor at the leading end thereof and when said endless conveyor is stationary, a vertically disposed mould-ring plate receiving magazine located between said horizontal upper stretch of the endless conveyor near the discharge end thereof and the leading end of said tracking rails and adapted to hold a vertical stack of mould-ring plates, mould-ring plate elevating and loading means associated with said receiving magazine and operative with the intermittent movement of the endless conveyor to transfer successive mould-ring plates from the hot-plates to said receiving magazine as they reach the discharge end of the endless conveyor and elevate them in succession to the leading end of said tracking rails and load each successive uppermost mould-ring plate on to said tracking rails in succession at the leading end of the tracking rails, mould-ring plate propelling means associated with said tracking rails and operative with the intermittent movement of the endless conveyor to move the mould-ring plates along said tracking rails in succession from the receiving magazine to the loading magazine and an overhead crumpet-batter supply means near the leading end of the endless conveyor adapted to deposit crumpet batter into each successive mould-ring plate passing therebeneath on a hot-plate.

20. A machine for making crumpets and the like comprising an intermittently movable endless conveyor embodying transversely arranged hot-plates and having a substantially horizontal upper stretch which is adapted to carry a succession of mould-ring plates in which crumpet batter or the like is cooked as the mould-ring plates traverse said horizontal upper stretch of the endless conveyor from a leading end to a discharge end of said endless conveyor, means for driving the endless conveyor intermittently, overhead longitudinally-extending tracking rails in tranversely spaced relationship disposed above the endless conveyor and arranged so that a leading end of said tracking rails is located above the vicinity of the discharge end of the endless conveyor and a discharge end of said tracking rails is located above the vicinity of the leading end of the endless conveyor, a vertically disposed mould-ring plate loading magazine located between said horizontal upper stretch of the endless conveyor near the leading end thereof and the discharge end of said tracking rails and adapted to hold a vertical stack of mould-ring plates, mould-ring plate delivering means associated with said loading magazine and operative with the intermittent movement of the endless conveyor to load each successive lowermost mould-ring plate in the loading magazine on to each successive hot-plate coincidental with the arrival of each hot-plate at said horizontal stretch of the endless conveyor at the leading end thereof and when said endless conveyor is stationary, a vertically disposed mould-ring plate receiving magazine located between said horizontal upper stretch of the endless conveyor near the discharge end thereof and the leading end of said tracking rails and adapted to hold a vertical stack of mould-ring plates, mould-ring plate elevating and loading means associated with said receiving magazine and operative with the intermittent movement of the endless conveyor to transfer successive mould-ring plates from the hot-plates to said receiving magazine as they reach the discharge end of the endless conveyor and elevate them in succession to the leading end of said tracking rails and load each successive uppermost mould-ring plate on to said tracking rails in succession at the leading end of the tracking rails, mould-ring plate propelling means associated with said tracking rails and operative with the intermittent movement of the endless conveyor to move the mould-ring plates along said tracking rails in succession from the receiving magazine to the loading magazine and an overhead crumpet cooking means near the discharge end of the endless conveyor adapted to cook the top of the crumpets.

21. A machine for making crumpets and the like comprising an intermittently movable endless conveyor embodying transversely arranged hot-plates and having a substantially horizontal upper stretch which is adapted to carry a succession of mould-ring plates in which crumpet batter or the like is cooked as the mould-ring plates traverse said horizontal upper stretch of the endless conveyor from a leading end to a discharge end of said endless conveyor, means for driving the endless conveyor intermittently, overhead longitudinally-extending tracking rails in transversely spaced relationship disposed above the endless conveyor and arranged so that a leading end of said tracking rails is located above the vicinity of the discharge end of the endless conveyor and a discharge end of said tracking rails is located above the vicinity of the leading end of the endless conveyor, a vertically disposed mould-ring plate loading magazine located between said horizontal upper stretch of the endless conveyor near the leading end thereof and the discharge end of said tracking rails and adapted to hold a vertical stack of mould-ring plates, mould-ring plate delivering means associated with said loading magazine and operative with the intermittent movement of the endless conveyor to load each successive lowermost mould-ring plate in the loading magazine on to each successive hot-plate coincidental with the arrival of each hot-plate at said horizontal stretch of the endless conveyor at the leading end thereof and when said endless conveyor is stationary, a vertically disposed mould-ring plate receiving magazine located between said horizontal upper stretch of the endless conveyor near the discharge end thereof and the leading end of said tracking rails and adapted to hold a vertical stack of mould-ring plates, mould-ring plate elevating and loading means associated with said receiving magazine and operative with the intermittent movement of the endless conveyor to transfer successive mould-ring plates from the hot-plates to said receiving magazine as they reach the discharge end of the endless conveyor and elevate them in succession to the leading end of said tracking rails and load each successive uppermost mould-ring plate on to said tracking rails in succession at the leading end of the tracking rails, mould-ring plate propelling means associated with said tracking rails and operative with the intermittent movement of the endless conveyor to move the mould-ring plates along said tracking rails in succession from the receiving magazine to the loading magazine and a crumpet-slicing means near the discharge end of the endless conveyor adapted to engage with the top face of each hot-plate and slice the cooked crumpets from the hot-plates for discharge from the machine.

22. A machine for making crumpets and the like comprising an intermittently movable endless conveyor embodying transversely arranged hot-plates and having a substantially horizontal upper stretch which is adapted to carry a succession of mould-ring plates in which crumpet batter or the like is cooked as the mould-ring plates traverse said horizontal upper stretch of the endless conveyor from a leading end to a discharge end of said endless conveyor, means for driving the endless conveyor intermittently, overhead longitudinally-extending tracking rails in transversely spaced relationship disposed above the endless conveyor and arranged so that a leading end of said tracking rails is located above the vicinity of the discharge end of the endless conveyor and a discharge end of said tracking rails is located above the vicinity of the leading end of the endless conveyor, a vertically disposed mould-ring plate loading magazine located between said horizontal upper stretch of the endless conveyor near the leading end thereof and the discharge end of said tracking rails and adapted to hold a vertical stack of mould-ring plates, mould-ring plate delivering means associated with said loading magazine and operative with the intermittent movement of the endless conveyor to load each successive lowermost mould-ring plate in the loading magazine on to each successive hot-plate coincidental with the arrival of each hot-plate at said horizontal stretch of the endless conveyor at the leading end thereof and when said endless conveyor is stationary, a vertically disposed mould-ring plate receiving magazine located between said horizontal upper stretch of the endless conveyor near the discharge end thereof and the leading end of said tracking rails and adapted to hold a vertical stack of mould-ring plates, mould-ring plate elevating and loading means associated with said receiving magazine and operative with the intermittent movement of the endless conveyor to transfer successive mould-ring plates from the hot-plates to said receiving magazine as they reach the discharge end of the endless conveyor and elevate them in succession to the leading end of said tracking rails and load each successive uppermost mould-ring plate on to said tracking rails in succession at the leading end of the tracking rails, mould-ring plate propelling means associated with said tracking rails and operative with the intermittent movement of the endless conveyor to move the mould-ring plates along said tracking rails in succession from the receiving magazine to the loading magazine and an overhead mould-ring cleaning and oiling means adapted to clean and oil the rings of each successive mould-ring plate as the mould-ring plates are moved along the overhead track means.

23. A machine according to claim 22, wherein said mould-ring cleaning and oiling means comprise a plurality of rotary cleaning and oiling brush members carried by arms connected to shafts having toothed pinions geared to a common drive shaft supported by bearing blocks mounted on a cross-bar supported by the overhead track means, the assembly of brushes and associated mechanism being adapted to be lowered in timed relationship with the movement of the mould-ring plates and brush and oil the inner face of each mould-ring.

24. A machine for making crumpets and the like, comprising an endless conveyor embodying transversely arranged hot-plates and having a substantially horizontal upper stretch wihch is adapted to carry a succession of mould-ring plates in which crumpet batter or the like is cooked as the mould-ring plates traverse said horizontal upper stretch of the endless conveyor from a leading end to a discharge end of said endless conveyor, an overhead track means disposed above the endless conveyor and arranged so that a leading end of said track means is located above the vicinity of the discharge end of the endless conveyor and a discharge end of said track means is located above the vicinity of the leading end of the endless conveyor, mould-ring plate elevating and loading means near the discharge end of the endless conveyor adapted to elevate the mould-ring plates as they reach the discharge end of the endless conveyor in succession to the leading end of said overhead track means and load them on to said track means in succession at the leading end of the track means, mould-ring plate propelling means associated with said overhead track means and adapted to move the mould-ring plates along said overhead track means in succession to the discharge end of said overhead track means, and mould-ring plate lowering and loading means near the leading end of the endless conveyor adapted to lower the mould-ring plates as they reach the discharge end of the overhead track means in succession to the leading end of the endless conveyor and load them on to said endless conveyor in succession at the leading end of the endless conveyor and an overhead crumpet-batter supply means near the leading end of the endless conveyor adapted to deposit crumpet batter into each successive mould-ring plate passing therebeneath on a hot-plate.

25. A machine for making crumpets and the like comprising an endless conveyor embodying transversely arranged hot-plates and having a substantially horizontal upper stretch which is adapted to carry a succession of mould-ring plates in which crumpet batter or the like is cooked as the mould-ring plates traverse said horizontal upper stretch of the endless conveyor from a leading end to a discharge end of said endless conveyor, an overhead track means disposed above the endless conveyor and arranged so that a leading end of said track means is located above the vicinity of the discharge end of the endless conveyor and a discharge end of said track means is located above the vicinity of the leading end of the endless conveyor, mould-ring plate elevating and loading means near the discharge end of the endless conveyor adapted to elevate the mould-ring plates as they reach the discharge end of the endless conveyor in succession to the leading end of said overhead track means and load them on to said track means in succession at the leading end of the track means, mould-ring plate propelling means associated with said overhead track means and adapted to move the mould-ring plates along said overhead track means in succession to the discharge end of said overhead track means, and mould-ring plate lowering and loading means near the leading end of the endless conveyor adapted to lower the mould-ring plates as they reach the discharge end of the overhead track means in succession to the leading end of the endless conveyor and load them on to said endless conveyor in succession at the leading end of the endless conveyor and an overhead crumpet cooking means near the discharge end of the endless conveyor adapted to cook the top of the crumpets.

26. A machine for making crumpets and the like, comprising an endless conveyor embodying transversely arranged hot-plates and having a substantially horizontal upper stretch which is adapted to carry a succession of mould-ring plates in which crumpet batter or the like is cooked as the mould-ring plates traverse said horizontal upper stretch of the endless conveyor from a leading end to a discharge end of said endless conveyor, an overhead track means disposed above the endless conveyor and arranged so that a leading end of said track means is located above the vicinity of the discharge end of the endless conveyor and a discharge end of said track means is located above the vicinity of the leading end of the endless conveyor, mould-ring plate elevating and loading means near the discharge end of the endless conveyor adapted to elevate the mould-ring plates as they reach the discharge end of the endless conveyor in succession to the leading end of said overhead track means and load them on to said track means in succession at the leading end of the track means, mould-ring plate propelling means associated with said overhead track means and adapted to move the mould-ring plates along said overhead track means in succession to the discharge end of said overhead track means, and mould-ring plate lowering and loading means near the leading end of the endless conveyor adapted to lower the mould-ring plates as they reach the discharge end of the overhead track means in succession to the leading end of the endless conveyor and load them on to said endless conveyor in succession at the leading end of the endless conveyor and a crumpet slicing means near the discharge end of the endless conveyor adapted to engage with the top face of each hot-plate and slice the cooked crumpets from the hot-plates for discharge from the machine.

27. A machine for making crumpets and the like, comprising an endless conveyor embodying transversely arranged hot-plates and having a substantially horizontal upper stretch which is adapted to carry a succession of mould-ring plates in which crumpet batter or the like is cooked as the mould-ring plates traverse said horizontal upper stretch of the endless conveyor from a leading end to a discharge end of said endless conveyor, an overhead track means disposed above the endless conveyor and arranged so that a leading end of said track means is located above the vicinity of the discharge end of the endless conveyor and a discharge end of said track means is located above the vicinity of the leading end of the endless conveyor, mould-ring plate elevating and loading means near the discharge end of the endless conveyor adapted to elevate the mould-ring plates as they reach the discharge end of the endless conveyor in succession to the leading end of said overhead track means and load them on to said track means in succession at the leading end of the track means, mould-ring plate propelling means associated with said overhead track means and adapted to move the mould-ring plates along said overhead track means in succession to the discharge end of said overhead track means, and mould-ring plate lowering and loading means near the leading end of the endless conveyor adapted to lower the mould-ring plates as they reach the discharge end of the overhead track means in succession to the leading end of the endless conveyor and load them on to said endless conveyor in succession at the leading end of the endless conveyor and an overhead mould-ring cleaning and oiling means adapted to clean and oil the rings of each successive mould-ring plate as the mould-ring plates are moved along the overhead track means.

28. A machine according to claim 27, wherein said mould-ring cleaning and oiling means comprise a plurality of rotary cleaning and oiling brush members carried by arms connected to shafts having toothed pinions geared to a common drive shaft supported by bearing blocks mounted on a cross-bar supported by the overhead track means, the assembly of brushes and associated mechanism being adapted to be lowered in timed relationship with the movement of the mould-ring plates and brush and oil the inner face of each mould-ring.

29. A machine for making crumpets and the like, comprising an endless conveyor embodying transversely arranged hot-plates and having a substantially horizontal upper stretch which is adapted to carry a succession of mould-ring plates in which crumpet batter or the like is cooked as the mould-ring plates traverse said horizontal upper stretch of the endless conveyor from a leading end to a discharge end of said endless conveyor, an overhead longitudinally-extending track means disposed above the endless conveyor and arranged so that a leading end of said track means is located above the vicinity of the discharge end of the endless conveyor and a discharge end of said track means is located above the vicinity of the leading end of the endless conveyor, a mould-ring plate loading magazine disposed between said horizontal upper stretch of the endless conveyor near the leading end thereof and the discharge end of said track means and adapted to hold a stack of mould-ring plates, mould-ring plate delivering means associated with said loading magazine and adapted to load the mould-ring plates in said stack in succession on to each successive hot-plate reaching said horizontal upper stretch at the leading end of the endless conveyor, a mould-ring plate receiving magazine disposed between said horizontal upper stretch of the endless conveyor near the discharge end thereof and the leading end of said track means and adapted to hold a stack of mould-ring plates, mould-ring plate elevating and loading means adapted to transfer each successive mould-ring plate from the hot-plates to said receiving magazine as they reach the discharge end of the endless conveyor and elevate them in succession to the leading end of said overhead track means and load them on to said track means in succession at the leading end of the track means, mould-ring plate propelling means associated with said overhead track means and adapted to move the mould-ring plates along said overhead track means in succession from the receiving magazine to the loading magazine and an overhead crumpet-batter supply means near the leading end of the endless conveyor adapted to deposit crumpet batter into each successive mould-ring plate passing therebeneath on a hot-plate.

30. A machine for making crumpets and the like, comprising an endless conveyor embodying transversely arranged hot-plates and having a substantially horizontal upper stretch which is adapted to carry a succession of mould-ring plates in which crumpet batter or the like is cooked as the mould-ring plates traverse said horizontal upper stretch of the endless conveyor from a leading end to a discharge end of said endless conveyor, an overhead longitudinally-extending track means disposed above the endless conveyor and arranged so that a leading end of said track means is located above the vicinity of the discharge end of the endless conveyor and a discharge end of said track means is located above the vicinity of the leading end of the endless conveyor, a mould-ring plate loading magazine disposed between said horizontal upper stretch of the endless conveyor near the leading end thereof and the discharge end of said track means and adapted to hold a stack of mould-ring plates, mould-ring plate delivering means associated with said loading magazine and adapted to load the mould-ring plates in said stack in succession on to each successive hot-plate reaching said horizontal upper stretch at the leading end of the endless conveyor, a mould-ring plate receiving magazine disposed between said horizontal upper stretch of the endless conveyor near the discharge end thereof and the leading end of said track means and adapted to hold a stack of mould-ring plates, mould-ring plate elevating and loading means adapted to transfer each successive mould-ring plate from the hot-plates to said receiving magazine as they reach the discharge end of the endless conveyor and elevate them in succession to the leading end of said overhead track means and load them on to said track means in succession at the leading end of the track means, mould-ring plate propelling means associated with said overhead track means and adapted to move the mould-ring plates along said overhead track means in succession from the receiving magazine to the loading magazine and an overhead crumpet cooking means near the discharge end of the endless conveyor adapted to cook the top of the crumpets.

31. A machine for making crumpets and the like, comprising an endless conveyor embodying transversely arranged hot-plates and having a substantially horizontal upper stretch which is adapted to carry a succession of mould-ring plates in which crumpet batter or the like is cooked as the mould-ring plates traverse said horizontal upper stretch of the endless conveyor from a leading end to a discharge end of said endless conveyor, an overhead longitudinally-extending track means disposed above the endless conveyor and arranged so that a leading end of said track means is located above the vicinity of the discharge end of the endless conveyor and a discharge end of said track means is located above the vicinity of the leading end of the endless conveyor, a mould-ring plate loading magazine disposed between said horizontal upper stretch of the endless conveyor near the leading end thereof and the discharge end of said track means and adapted to hold a stack of mould-ring plates, mould-ring plate delivering means associated with said loading magazine and adapted to load the mould-ring plates in said stack in succession on to each successive hot-plate reaching said horizontal upper stretch at the leading end of the endless conveyor, a mould-ring plate receiving magazine disposed between said horizontal upper stretch of the endless conveyor near the discharge end thereof and the leading end of said track means and adapted to hold a stack of mould-ring plates, mould-ring plate elevating and loading means adapted to transfer each successive mould-ring plate from the hot-plates to said receiving magazine as they reach the discharge end of the endless conveyor and elevate them in succession to the leading end of said overhead track means and load them on to said track means in succession at the leading end of the track means, mould-ring plate propelling means associated with said overhead track means and adapted to move the mould-ring plates along said overhead track means in succession from the receiving magazine to the loading magazine, and a crumpet-slicing means near the discharge end of the endless conveyor adapted to engage with the top face of each hot-plate and slice the cooked crumpets from the hot-plates for discharge from the machine.

32. A machine for making crumpets and the like, comprising an endless conveyor embodying transversely arranged hot-plates and having a substantially horizontal upper stretch which is adapted to carry a succession of mould-ring plates in which crumpet batter or the like is cooked as the mould-ring plates traverse said horizontal upper stretch of the endless conveyor from a leading end to a discharge end of said endless conveyor, an overhead longitudinally-extending track means disposed above the endless conveyor and arranged so that a leading end of said track means is located above the vicinity of the discharge end of the endless conveyor and a discharge end of said track means is located above the vicinity of the leading end of the endless conveyor, a mould-ring plate loading magazine disposed between said horizontal upper stretch of the endless conveyor near the leading end thereof and the discharge end of said track means and adapted to hold a stack of mould-ring plates, mould-ring plate delivering means associated with said loading magazine and adapted to load the mould-ring plates in said stack in succession on to each successive hot-plate reaching said horizontal upper stretch at the leading end of the endless conveyor, a mould-ring plate receiving magazine disposed between said horizontal upper stretch of the endless conveyor near the discharge end thereof and the leading end of said track means and adapted to hold a stack of mould-ring plates, mould-ring plate elevating and loading means adapted to transfer each successive mould-ring plate from the hot-plates to said receiving magazine as they reach the discharge end of the endless conveyor and elevate them in succession to the leading end of said overhead track means and load them on to said track means in succession at the leading end of the track means, mould-ring plate propelling means associated with said overhead track means and adapted to move the mould-ring plates along said overhead track means in succession from the receiving magazine to the loading magazine and an overhead mould-ring cleaning and oiling means adapted to clean and oil the rings of each successive mould-ring plate as the mould-ring plates are moved along the overhead track means.

33. A machine according to claim 32, wherein said mould-ring cleaning and oiling means comprise a plurality of rotary cleaning and oiling brush members carried by arms connected to shafts having toothed pinions geared to a common drive shaft supported by bearing blocks mounted on a cross-bar supported by the overhead track means, the assembly of brushes and associated mechanism being adapted to be lowered in timed relationship with the movement of the mould-ring plates and brush and oil the inner face of each mould-ring.

References Cited in the file of this patent

UNITED STATES PATENTS

| | | |
|---|---|---|
| 2,897,772 | Hunter | Aug. 4, 1959 |

FOREIGN PATENTS

| | | |
|---|---|---|
| 124,204 | Australia | May 7, 1947 |
| 154,070 | Australia | Nov. 10, 1953 |
| 787,402 | Great Britain | Dec. 11, 1957 |